UNITED STATES PATENT OFFICE.

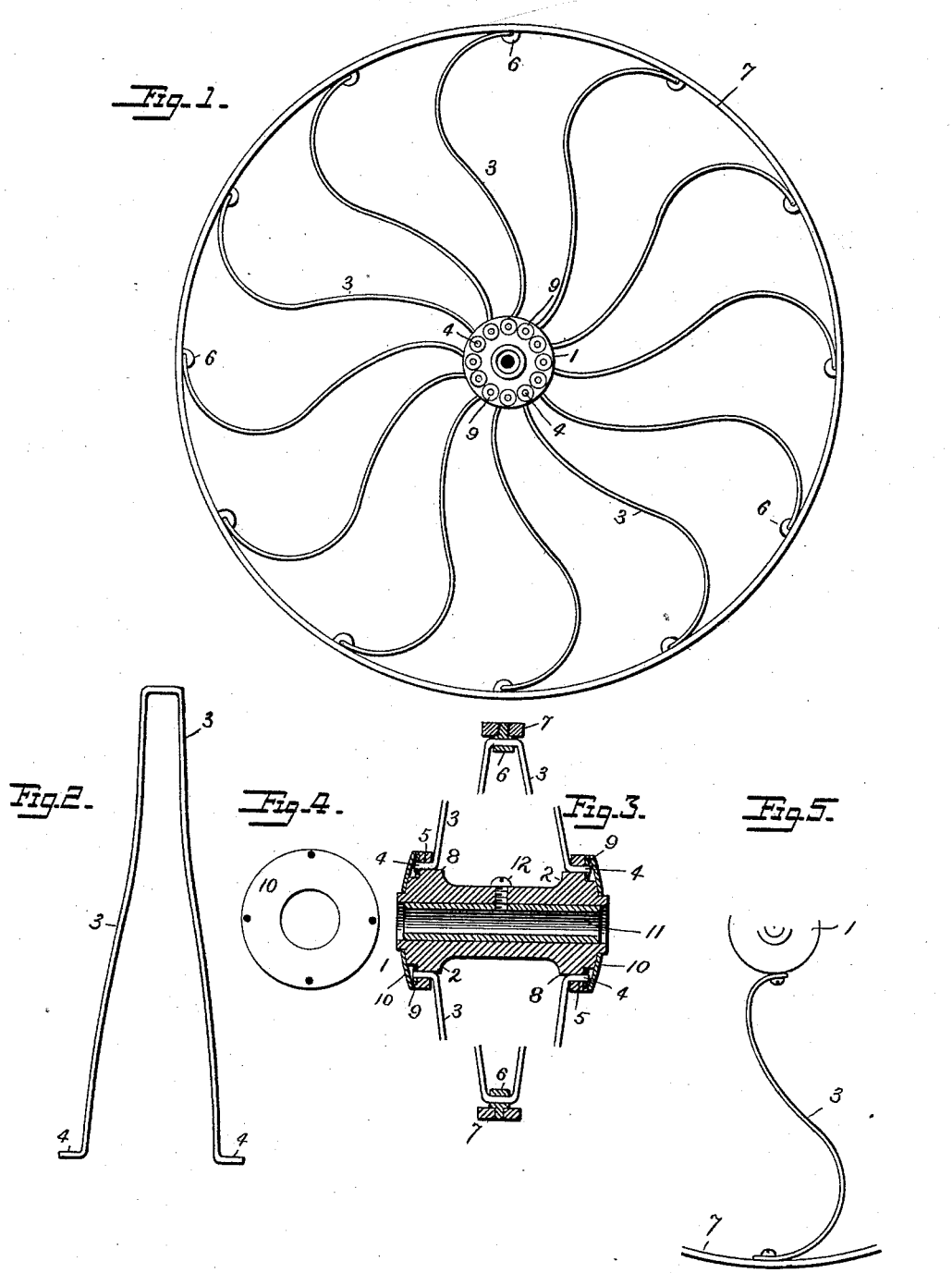

THOMAS P. OLIVER, OF MORTON, ASSIGNOR OF ONE-HALF TO MICHAEL PFEIFER, OF PEORIA, ILLINOIS.

WHEEL.

SPECIFICATION forming part of Letters Patent No. 415,787, dated November 26, 1889.

Application filed August 3, 1889. Serial No. 319,685. (No model.)

*To all whom it may concern:*

Be it known that I, THOMAS P. OLIVER, a citizen of the United States, residing at Morton, in the county of Tazewell and State of Illinois, have invented certain new and useful Improvements in Wheels, of which the following is a specification.

Figure 1 is a plan view of my improved wheel with the cap removed from the end of the hub. Fig. 2 is a plan view of one of the spokes. Fig. 3 is a sectional view of the hub and of the tire, showing the ends of the spokes secured in place; and Fig. 4 is a plan view of the cap which fits over the end of the hub.

My invention relates to metallic wheels, and has for its object to permit of a slight yielding of the tire and spokes in passing over obstructions, and this I do by using curved spokes and by connecting the ends of the spokes flexibly to the hub and rim or tire, as will be hereinafter described.

1 indicates the hub, which is provided with a flange 2 at each end, to which the inner ends of the spokes 3 are secured, preferably by passing the laterally-extended portions 4 4 through holes 5 and riveting them. Each of the spokes is made double, or with two legs, as shown in Fig. 2, which slightly diverge from each other at their free ends. This construction causes them to act as braces laterally to prevent the wheel from breaking down when the load comes on it from one side as well as from the top. The end where the spokes are secured to the rim or tire is formed into a sort of loop having the end portion at right angles to the sides, in order that such portion may act as a hinge in the bearing of a lug 6 upon the rim, by means of which lug each spoke is secured to the tire, the sides preventing the spoke from being drawn or forced through the hole or bearing by lateral pressure upon the wheel. The lug 6 may be formed or secured upon the interior of the rim 7 in any suitable manner, as by providing it with a shank which may be screw-threaded to fit a corresponding screw-threaded hole in the rim, or it may be riveted in or even welded to the rim without the shank. It is made sufficiently narrow to permit of the spokes being within the outer edges of the rim, so as not to catch upon rocks or other projections upon the ground over which it is traveling.

As will be seen by reference to the drawings, the outer portion of each spoke is curved more than that which is next to the hub, whereby the greatest give or yield of the spoke is nearest the rim, where it should be to respond the most quickly to the inward pressure of the rim, while the portion nearest to the hub is not so much curved to give the spokes the required rigidity to make the wheel strong enough for the heaviest use—that is, the curve resembles an "ogee;" or, in other words, the inner portion of each spoke is substantially radial to the hub, while the outer portion is substantially tangential to the rim.

To prevent the liability of breaking at the point where the spokes are bent and secured to the hub, a shoulder 8 is formed upon the interior of each flange just within the circle of holes in which the spokes are secured, so that the inner or end thrust of the spokes is partly taken up by the shoulder, but still not to such an extent as to prevent the free movement of the end of the spoke when its relative position to the hub has been changed by the curving of the outer portion. If desired, small washers 9 may be placed over the ends of the spokes before they are riveted in the hub. A cap 10 is then secured upon each end of the hub by screws or rivets to give it a neater or more finished appearance, the washers 9 being placed in small countersunk holes in the hub to permit the cap being placed closely against the end of the hub.

The hub may be cast with the axle-box integral with it, or it may have the axle-box inserted into it after it has been finished, in order that a worn-out box may be removed and replaced with a new one, as shown in the drawings, the axle-box 11 being secured in place by the screw 12, which projects through the central portion of the hub and with its inner end into the box.

As the length of the hub is so much greater than the width of the rim of the wheel, it is evident that by spreading the spokes to secure them to the ends of the hub the wheel is braced laterally and makes it virtually as rigid in that direction as a solid wheel, while the peculiar conformation of the spokes with a flexible connection of each end of each spoke makes a very desirable wheel for all purposes. Of course it is evident that the spokes may be made out of any suitable material, as iron or steel, and be round, square, flat, or oval in cross-section, and the hub may be differently constructed in their general shape.

Instead of jointing the ends of the spokes to the hub and rim, they may be screwed pivotally by bolts or rivets, as shown in Fig. 5.

Without limiting myself to the precise construction and arrangement of parts shown, I claim—

1. In a wheel, the combination, with the rim and hub, of double spokes, each of a rod bent to form a substantial loop at the point where it is to be secured to the rim, each leg of said spokes being ogee-shaped and diverging from each other and jointedly secured to the rim and hub at its ends, substantially as described.

2. In a wheel, the combination, with the rim and hub, of spokes the inner ends of which are bent at an angle to the body portion of the hub, being provided with a flange having a series of perforations for the reception of the ends of the spokes, and a shoulder just within the perforations and against which the spokes bear when in position, substantially as described.

3. In a wheel, the combination, with the rim and spokes, of a hub each end of which is flanged and perforated, said flanges being countersunk at each perforation, a washer in each countersink, against which the inner end of the spoke is riveted, and a cap upon each end of the hub, substantially as described.

In testimony whereof I have signed my name to this specification in the presence of two subscribing witnesses.

THOMAS P. OLIVER.

Witnesses:
FREDERICK W. VOIGT,
ANDREW M. GOEBBELS.